United States Patent
Saeedi et al.

(10) Patent No.: US 11,259,035 B2
(45) Date of Patent: Feb. 22, 2022

(54) MACROBLOCK CODING TYPE PREDICTION

(71) Applicant: ATI Technologies ULC, Markham (CA)

(72) Inventors: Mehdi Saeedi, Markham (CA); Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/818,999

(22) Filed: Mar. 13, 2020

(65) Prior Publication Data

US 2020/0296393 A1    Sep. 17, 2020

Related U.S. Application Data

(60) Provisional application No. 62/819,462, filed on Mar. 15, 2019.

(51) Int. Cl.
*H04N 19/196* (2014.01)
*H04N 19/14* (2014.01)
*H04N 19/159* (2014.01)
*H04N 19/176* (2014.01)

(52) U.S. Cl.
CPC ........... *H04N 19/196* (2014.11); *H04N 19/14* (2014.11); *H04N 19/159* (2014.11); *H04N 19/176* (2014.11)

(58) Field of Classification Search
CPC ............................ H04N 19/159; H04N 19/176
See application file for complete search history.

(56) References Cited

U.S. PATENT DOCUMENTS

| | | | | |
|---|---|---|---|---|
| 2005/0152449 A1* | 7/2005 | Nemiroff | ............. | H04N 19/196 375/240.03 |
| 2005/0180500 A1* | 8/2005 | Chiang | .................. | H04N 19/14 375/240 |
| 2006/0088099 A1* | 4/2006 | Gao | ...................... | H04N 19/172 375/240.16 |
| 2006/0204113 A1* | 9/2006 | Wang | ................... | H04N 19/137 382/236 |
| 2009/0067738 A1* | 3/2009 | Fuchie | ................. | H04N 19/194 382/251 |
| 2009/0190660 A1* | 7/2009 | Kusakabe | ............ | H04N 19/107 375/240.13 |
| 2010/0027663 A1* | 2/2010 | Dai | ........................ | H04N 19/44 375/240.16 |
| 2010/0124285 A1* | 5/2010 | Kwon | .................. | H04N 19/105 375/240.24 |
| 2011/0206122 A1* | 8/2011 | Lu | ........................ | H04N 19/172 375/240.13 |
| 2011/0249728 A1* | 10/2011 | Bock | ...................... | H04N 19/61 375/240.03 |
| 2012/0183053 A1* | 7/2012 | Lu | ........................ | H04N 19/197 375/240.03 |
| 2013/0343450 A1* | 12/2013 | Solka | ................. | H04N 21/2343 375/240.03 |

(Continued)

*Primary Examiner* — Mainul Hasan
(74) *Attorney, Agent, or Firm* — Volpe Koenig (57) ABSTRACT

Techniques are provided herein for processing video data. The techniques include generating predicted macroblock coding modes for a set of macroblocks of a frame, assigning quantization parameters to the macroblocks based on the predicted macroblock coding modes, and encoding the set of macroblocks based on the quantization parameters.

20 Claims, 6 Drawing Sheets

(56) References Cited

U.S. PATENT DOCUMENTS

| | | | |
|---|---|---|---|
| 2015/0063461 A1* | 3/2015 | Zheng | H04N 19/60 |
| | | | 375/240.24 |
| 2015/0334395 A1* | 11/2015 | Schwartz | H04N 19/194 |
| | | | 375/240.03 |
| 2018/0020220 A1* | 1/2018 | Leontaris | H04N 19/194 |
| 2018/0027245 A1* | 1/2018 | Tourapis | H04N 19/17 |
| | | | 375/240.03 |

* cited by examiner

MACROBLOCK CODING TYPE PREDICTION

CROSS-REFERENCE TO RELATED APPLICATIONS

This application claims priority to U.S. Provisional Patent Application Ser. No. 62/819,462, entitled "QP MAP SHAPING IN VIDEO ENCODE BY REGIONAL BLOCK TYPE PREDICTOR," and filed on Mar. 15, 2019, the entirety of which is hereby incorporated herein by reference.

BACKGROUND

In a video encoding system, frames are divided into macroblocks and those macroblocks are encoded. In some modes of operation, different macroblocks of a frame are encoded with different coding types, such as intra-coded, inter-coded, and skip. Improvements to video encoding in relation to macroblock coding modes are constantly being made.

BRIEF DESCRIPTION OF THE DRAWINGS

A more detailed understanding is gained from the following description, given by way of example in conjunction with the accompanying drawings wherein.

DETAILED DESCRIPTION

Techniques are provided herein for processing video data. The techniques include generating predicted macroblock coding modes for a set of macroblocks of a frame, assigning quantization parameters to the macroblocks based on the predicted macroblock coding modes, and encoding the set of macroblocks based on the quantization parameters.

It should be understood that when the term "macroblock" is used herein, this term refers to a unit of pixels in an unencoded frame and a corresponding encoded block of pixels. In some codecs, other terms, such as "coding tree unit" are used interchangeably with, or replace the term "macroblock." In instances where the term "macroblock" is used in the present disclosure, it should be understood that such disclosure also applies to these other terms that are used interchangeably with or that replace the term "macroblock." In addition, although the term "quantization parameter" is used, it should be understood that the description of the use of the quantization parameter herein applies to any metric that sets the quality and amount of data used for the macroblocks.

Figure 1A:
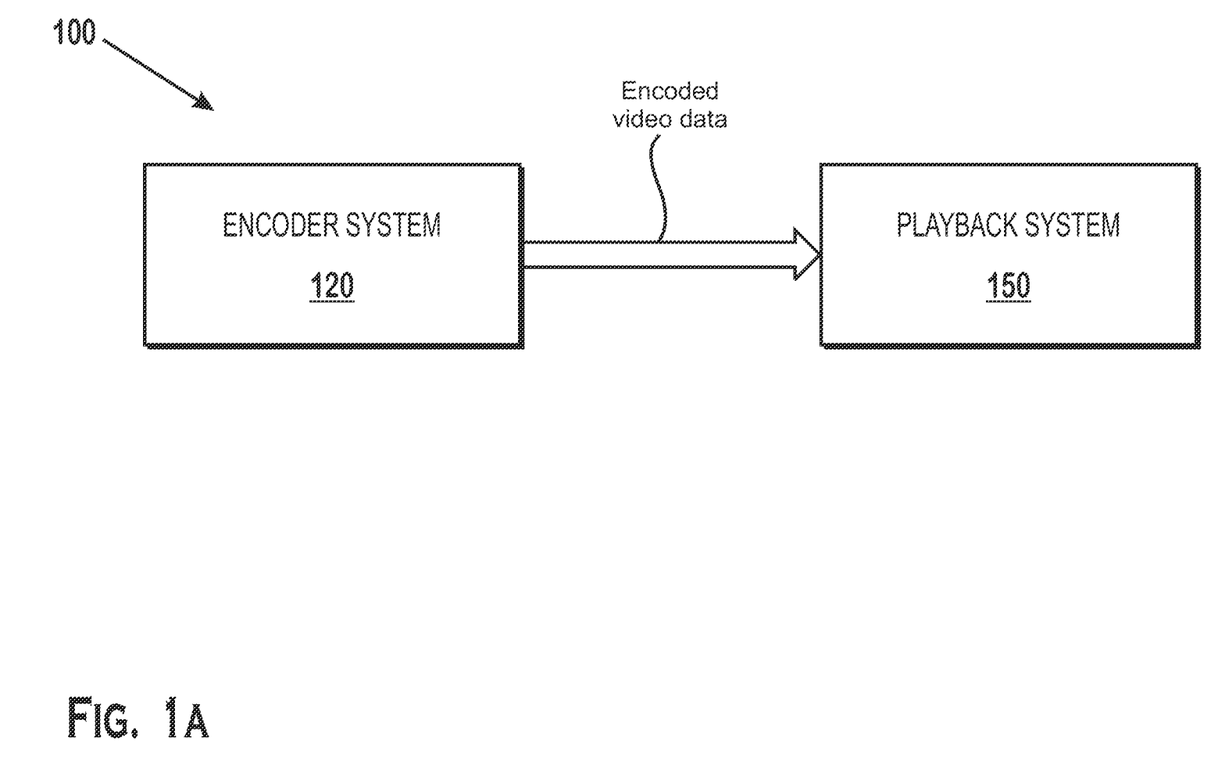
FIG. 1A is a block diagram of a video encoding and playback system, according to an example.

FIG. 1A is a block diagram of a video encoding and playback system 100, according to an example. An encoder system 120 and a playback system 150, which are both computing devices, are included in the system. In operation, the encoder system 120 encodes raw video data in a video format such as MPEG-4, AV1, or any other encoded media format. The encoder system 120 transmits the encoded video data to the playback system 150. The playback system 150 decodes the encoded video data and displays the decoded video data. In various implementations, the encoded video data is transmitted through one or more intermediaries before being played by the playback system 150.

Figure 1B:
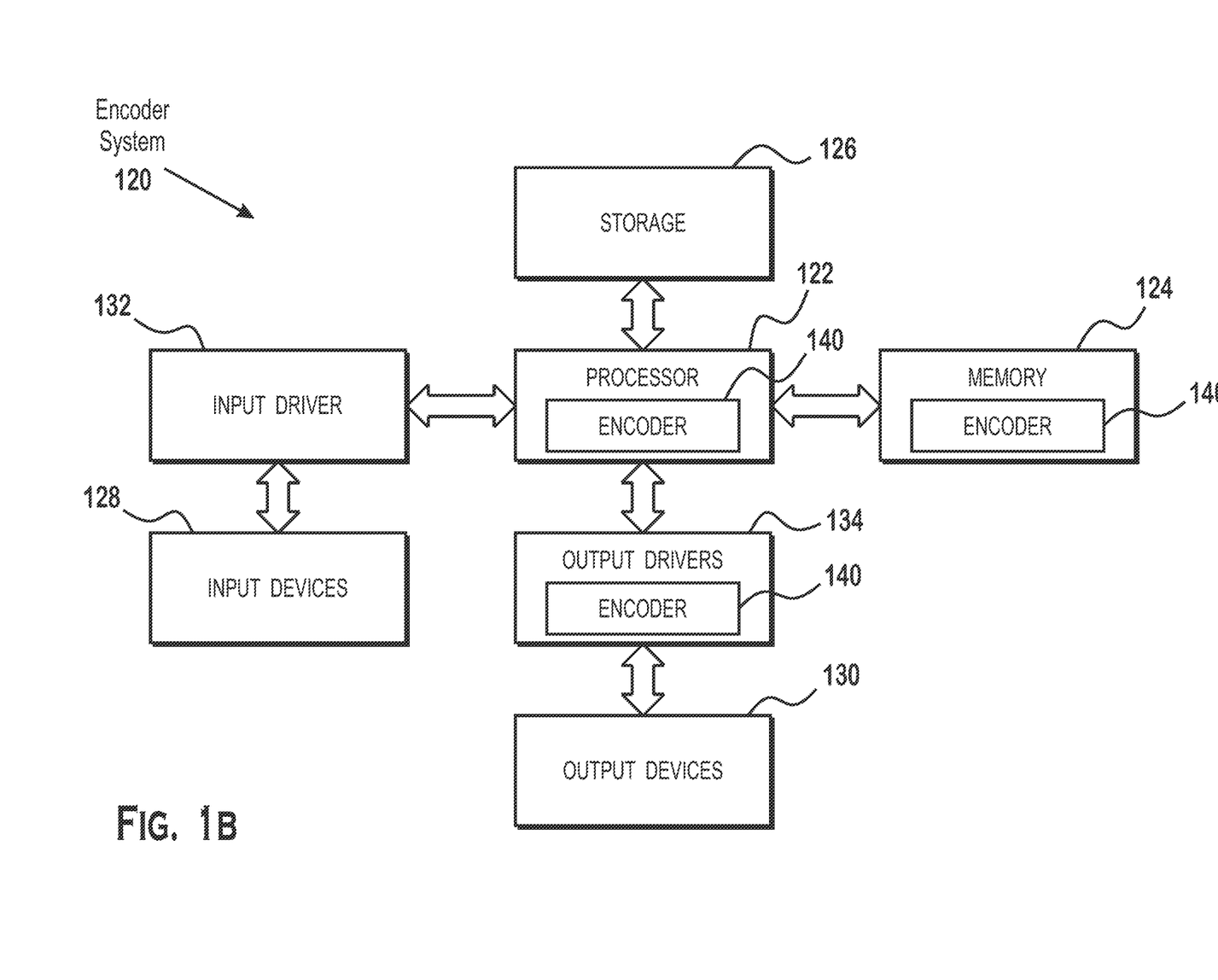
FIG. 1B is a block diagram of an example implementation of the encoder system.

FIG. 1B is a block diagram of an example implementation of the encoder system 120. It should be understood that although certain details are illustrated, an encoder system 120 of any configuration that includes an encoder 140 for performing encoding operations in accordance with the present disclosure is within the scope of the present disclosure.

The encoder system 120 includes a processor 122, a memory 124, a storage device 126, one or more input devices 128, and one or more output devices 130. The device optionally includes an input driver 132 and an output driver 134. It is understood that the device optionally includes additional components not shown in FIG. 1B.

The processor 122 includes one or more of: a central processing unit (CPU), a graphics processing unit (GPU), a CPU and GPU located on the same die, or one or more processor cores, wherein each processor core is a CPU or a GPU. The memory 124 is located on the same die as the processor 122 or separately from the processor 122. The memory 124 includes a volatile or non-volatile memory, for example, random access memory (RAM), dynamic RAM, or a cache.

The storage device 126 includes a fixed or removable storage, for example, a hard disk drive, a solid state drive, an optical disk, or a flash drive. The input devices 128 include one or more of a keyboard, a keypad, a touch screen, a touch pad, a detector, a microphone, an accelerometer, a gyroscope, or a biometric scanner. The output devices 130 include one or more of a display, a speaker, a printer, a haptic feedback device, one or more lights, or an antenna.

The input driver 132 communicates with the processor 122 and the input devices 128, and permits the processor 122 to receive input from the input devices 128. The output driver 134 communicates with the processor 122 and the output devices 130, and permits the processor 122 to send output to the output devices 130.

A video encoder 140 is shown in two different alternative forms. In a first form, the encoder 140 is software that is stored in the memory 124 and that executes on the processor 122 as shown. In a second form, the encoder 140 is at least a portion of a hardware video engine (not shown) that resides in output drivers 134. In other forms, the encoder 140 is a combination of software and hardware elements, with the hardware residing, for example, in output drivers 134, and the software executed on, for example, the processor 122.

Note that although some example input devices 128 and output devices 130 are described, it is possible for the encoder system 120 to include any combination of such devices, to include no such devices, or to include some such devices and other devices not listed.

Figure 1C:
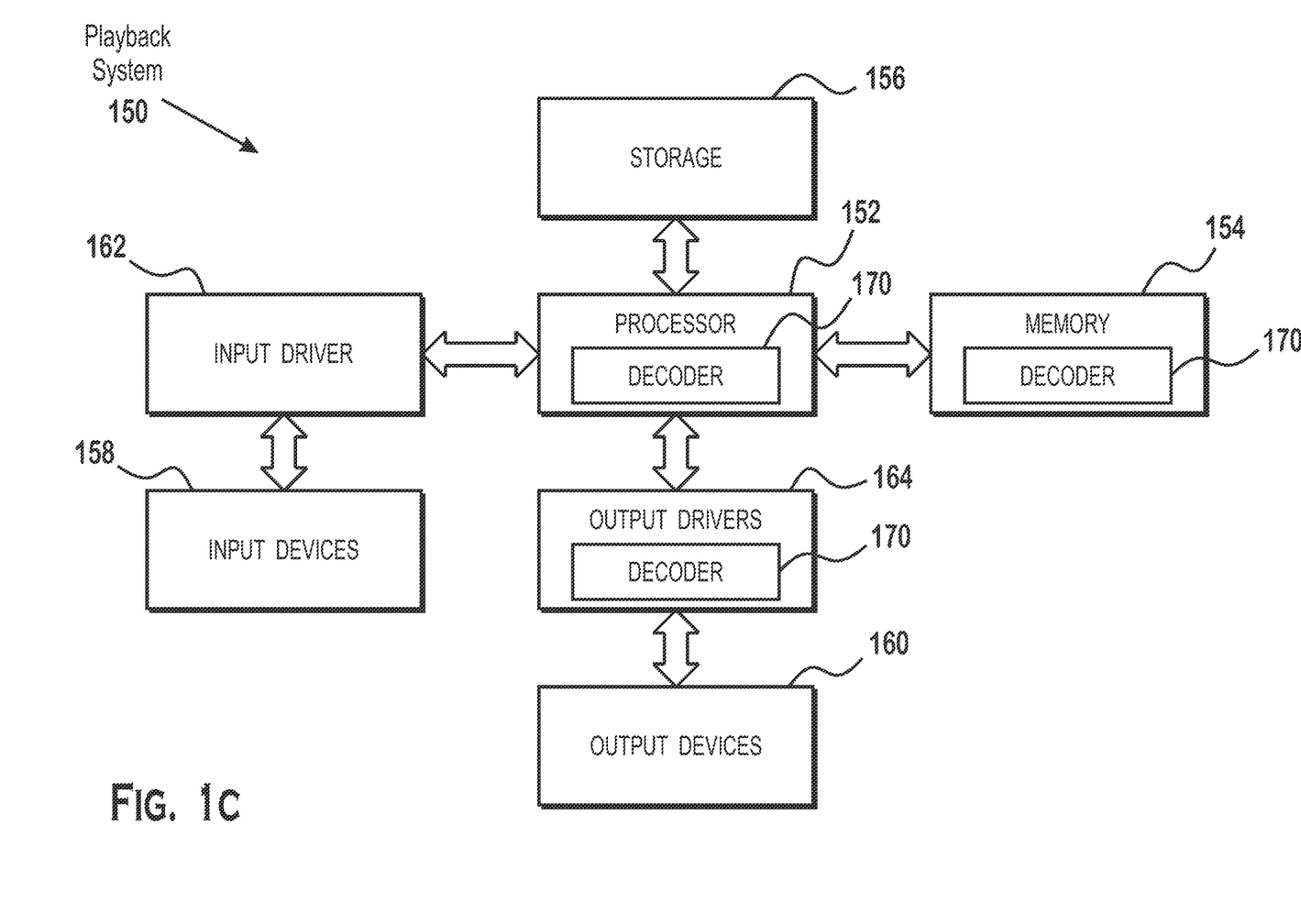
FIG. 1C is a block diagram of an example implementation of the playback system.

FIG. 1C is a block diagram of an example implementation of the playback system 150. This example implementation is similar to the example implementation of the encoder system 120, but the playback system 150 includes a decoder 170 instead of an encoder 140. Note that the illustrated implementation is just an example of a playback system 150 that receives and decodes video content, and that in various implementations, any of a wide variety of hardware configurations are used in a playback system 150 that receives and decodes video content from the encoder system 120.

The playback system 150 includes a processor 152, a memory 154, a storage device 156, one or more input devices 158, and one or more output devices 160. The device optionally includes an input driver 162 and an output driver 164. It is understood that the device optionally includes additional components not shown in FIG. 1C.

The processor 152 includes one or more of: a central processing unit (CPU), a graphics processing unit (GPU), a CPU and GPU located on the same die, or one or more processor cores, wherein each processor core is a CPU or a GPU. The memory 154 is located on the same die as the processor 152 or separately from the processor 152. The memory 154 includes a volatile or non-volatile memory, for example, random access memory (RAM), dynamic RAM, or a cache.

The storage device 156 includes a fixed or removable storage, for example, a hard disk drive, a solid state drive, an optical disk, or a flash drive. The input devices 158 include one or more of a keyboard, a keypad, a touch screen, a touch pad, a detector, a microphone, an accelerometer, a gyroscope, or a biometric scanner. The output devices 160 include one or more of a display, a speaker, a printer, a haptic feedback device, one or more lights, or an antenna.

The input driver 162 communicates with the processor 152 and the input devices 158, and permits the processor 152 to receive input from the input devices 158. The output driver 164 communicates with the processor 152 and the output devices 160, and permits the processor 152 to send output to the output devices 130.

A video decoder 170 is shown in two different alternative forms. In a first form, the decoder 170 is software that is stored in the memory 154 and that executes on the processor 152 as shown. In a second form, the decoder 170 is at least a portion of a hardware graphics engine that resides in output drivers 164. In other forms, the decoder 170 is a combination of software and hardware elements, with the hardware residing, for example, in output drivers 164, and the software executed on, for example, the processor 152.

Although an encoder 140, and not a decoder, is shown in the encoder system 120 and a decoder 170, and not an encoder, is shown in the playback system 150, it should be understood that in various implementations, either or both of the encoder system 120 and the playback system 150 include both an encoder and a decoder. In other words, it is possible for a single computer system to include both an encoder 140 and a decoder 170.

Note that although some example input devices 158 and output devices 160 are described, it is possible for the client 150 to include any combination of such devices, to include no such devices, or to include some such devices and other devices not listed.

Figure 2A:
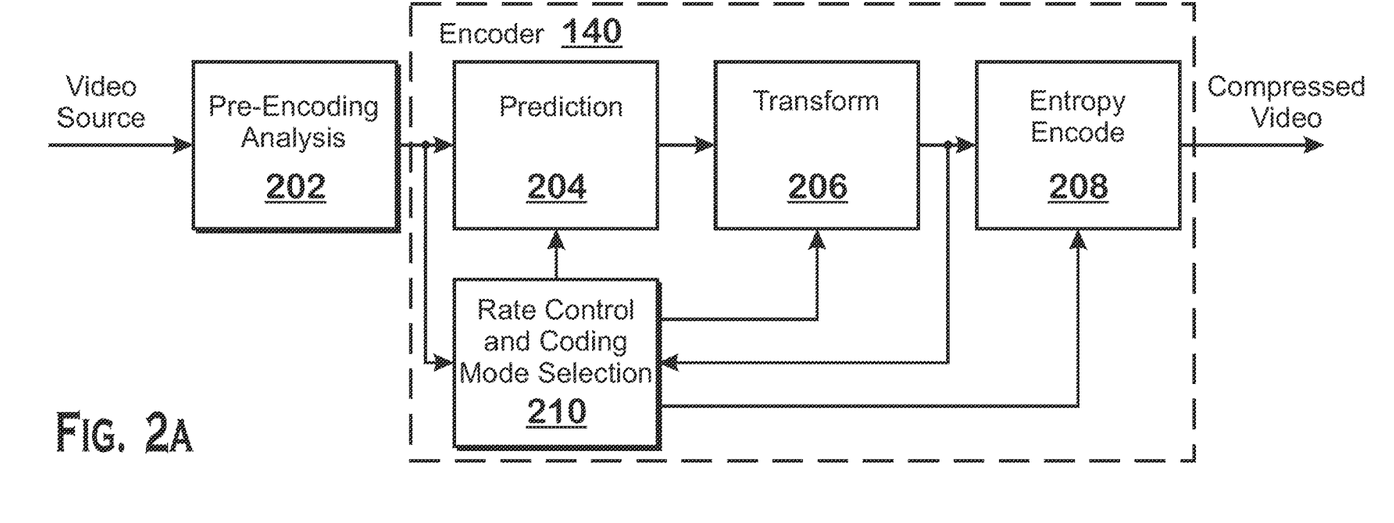
FIG. 2A presents a detailed view of the encoder of FIG. 1, according to an example.

FIG. 2A presents a detailed view of the encoder 140 of FIG. 1, according to an example. The encoder 140 accepts source video, encodes the source video to produce compressed video (or "encoded video"), and outputs the compressed video. In various implementations, the encoder 140 includes blocks other than those shown. In addition to the encoder 140, a pre-encoding analysis block 202 is shown. The encoder 140 includes a prediction block 204, a transform block 206, and an entropy encode block 208. In some alternatives, the encoder 140 implements one or more of a variety of known video encoding standards (such as MPEG2, H.264, or other standards), with the prediction block 204, transform block 206, and entropy encode block 208 performing respective portions of those standards. In other alternatives, the encoder 140 implements a video encoding technique that is not a part of any standard.

The pre-encoding analysis block 202 performs pre-encoding analysis on input frames. The pre-encoding analysis includes determining a quality map for macroblocks of the input frames. A quality map includes "target" quantization parameter ("QP") values for the macroblocks of the frames. As described elsewhere herein, the rate control and coding mode selection block 210 attempts to meet these QP values. The rate control and coding mode selection block 210 in some instances is unable to meet these values, such as where doing so would result in a failure to meet a bit budget. The encoder 140 sets the final, "actual" quantization parameter values for the macroblocks of the frames, but in certain implementations and/or modes of execution, uses the quality map generated by the pre-encoding analysis block 202 as a suggestion for how to set the QP values of the macroblocks. The pre-encoding analysis block 202 generates this quality map by performing content-specific analysis. In some examples, this content-specific analysis includes perceptual importance analysis (where one or more portions of a frame are deemed to be "perceptually important" and thus are afforded a greater number of bits than portions not deemed to be perceptually important), region of interest analysis (where a region of a frame is deemed to be "of interest" and thus afforded a greater number of bits), difficulty of compressibility, and other types of analysis.

The prediction block 204 performs prediction techniques to reduce the amount of information needed for a particular frame. Various prediction techniques are possible. One example of a prediction technique is a motion prediction based inter-prediction technique, where a block in the current frame is compared with different groups of pixels in a different frame or frames until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with a score deemed to be the "best," such as by having the lowest sum of absolute differences, is deemed to be a match. After finding a matching block, the current block is subtracted from the matching block to obtain a residual. The residual is further encoded by the transform block 206 and the entropy encode block 208 and the block is stored as the encoded residual plus the motion vector in the compressed video.

The transform block 206 performs an encoding step which is typically but not necessarily lossy, and converts the pixel data of the block into a compressed format. An example transform that is typically used is a discrete cosine transform (DCT). The discrete cosine transform converts the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A lower quantization parameter is associated with a greater number of possible values and thus requires a greater amount of data. A higher quantization parameter is associated with a lower number of possible values and thus requires a lower amount of data.

The entropy encode block 208 performs entropy coding on the coefficients of the blocks. Entropy coding is a lossless form of compression. Examples of entropy coding include context-adaptive variable-length coding and context-based adaptive binary arithmetic coding. The entropy coded transform coefficients describing the residuals, the motion vectors, and other information such as per-block QPs are output and stored or transmitted as the encoded video.

The rate control and coding mode selection block 210 performs rate control and coding mode selection functions. Coding mode selection includes selecting a coding mode for each macroblock. Possible coding modes include "skip," "inter-prediction," (which can include both forward-prediction ("P") blocks and bi-directional ("B") blocks) and "intra-coded blocks." A skip block is an indication to the decoder that no other information about that block is encoded. The decoder will use other information, such as information from the block in the same position from the previous frame, to render the block marked as a skip block. An inter-prediction coded block is a block that is encoded with reference to a block from a different frame. More specifically, the encoder 140 encodes a motion vector that indicates the location of the reference block in the different frame, as well as a residual, which indicates the difference between the block in the current frame and the reference block. A P block is a block for which the reference frame is a prior frame and a B block is a block for which the reference frame is in either a previous frame or a subsequent frame. An intra-coded block does not encode data based on a reference frame. Intra-coded blocks are coded based on content in the same frame. Typically, intra-coded blocks use more data than inter-coded blocks, which use more data than skip blocks.

Rate control involves setting quantization parameters for the macroblocks of a frame. In general, rate control involves setting quantization parameters so that the frame fits within a specific bit budget. The rate control and coding mode selection block 210 is able to override the quality map provided by the pre-encoding analysis block 202 in certain situations and to varying extents depending on the aggressiveness of rate control, such as where the quality map consistently results in macroblocks consuming too much data for the frame to fit within a frame budget.

Figure 2B:
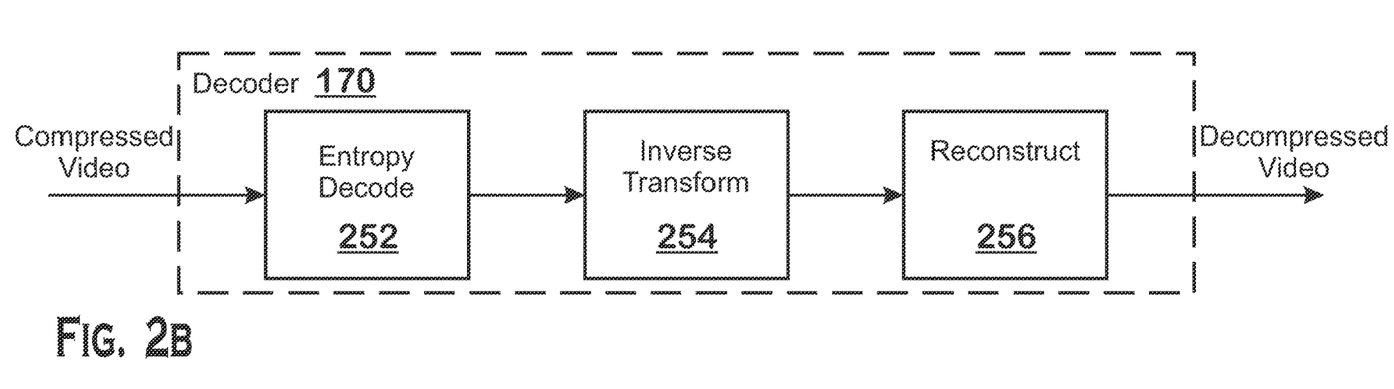
FIG. 2B represents a decoder for decoding compressed data generated by an encoder such as the encoder, according to an example.

FIG. 2B represents a decoder 170 for decoding compressed data generated by an encoder such as the encoder 140, according to an example. The decoder 170 includes an entropy decoder 252, an inverse transform block 254, and a reconstruct block. The entropy decoder 252 converts the entropy encoded information in the compressed video, such as compressed quantized transform coefficients, into raw (non-entropy-coded) quantized transform coefficients. The inverse transform block 254 converts the quantized transform coefficients into the residuals. The reconstruct block 256 obtains the predicted block based on the motion vector and adds the residuals to the predicted block to reconstruct the block.

Note that the operations described for FIGS. 2A and 2B only represent a small subset of the operations that encoder and decoders are capable of performing.

As stated above, the rate control and coding mode selection block 210 of the encoder 140 does not need to honor the quality map produced by the pre-encoding analysis block 202. For example, where honoring the quality map would result in the frame exceeding the bit budget for the frame, the rate control and coding mode selection block 210 does not honor that quality map. In addition, some quality maps undershoot the bit budget by a substantial amount, resulting in a failure to encode at a high enough quality level given the budget.

Due to the above, techniques are provided herein to provide additional information to the pre-encoding analysis block 202 so that the pre-encoding analysis block 202 is able to produce a quality map that does not result in an encoding that would exceed the bit budget for the frame. Generally, these techniques involve the pre-encoding analysis block 202 predicting the coding mode for blocks in the frame, and generating a quality map using that prediction information as well as the content-specific analysis described elsewhere herein. The coding mode is important because coding mode dictates the amount of data used by a block. More specifically, intra-coded blocks use more data than inter-coded blocks and inter-coded blocks use more data than skip blocks. By using the coding mode predictions, along with estimated data usage per block when coded with different coding modes, in generating the quality map, the pre-encoding analysis block 202 is better able to estimate the total amount of data used by a frame or by portions of the frame, and is therefore better able to avoid bit budget overshoots and substantial undershoots.

Figure 3:
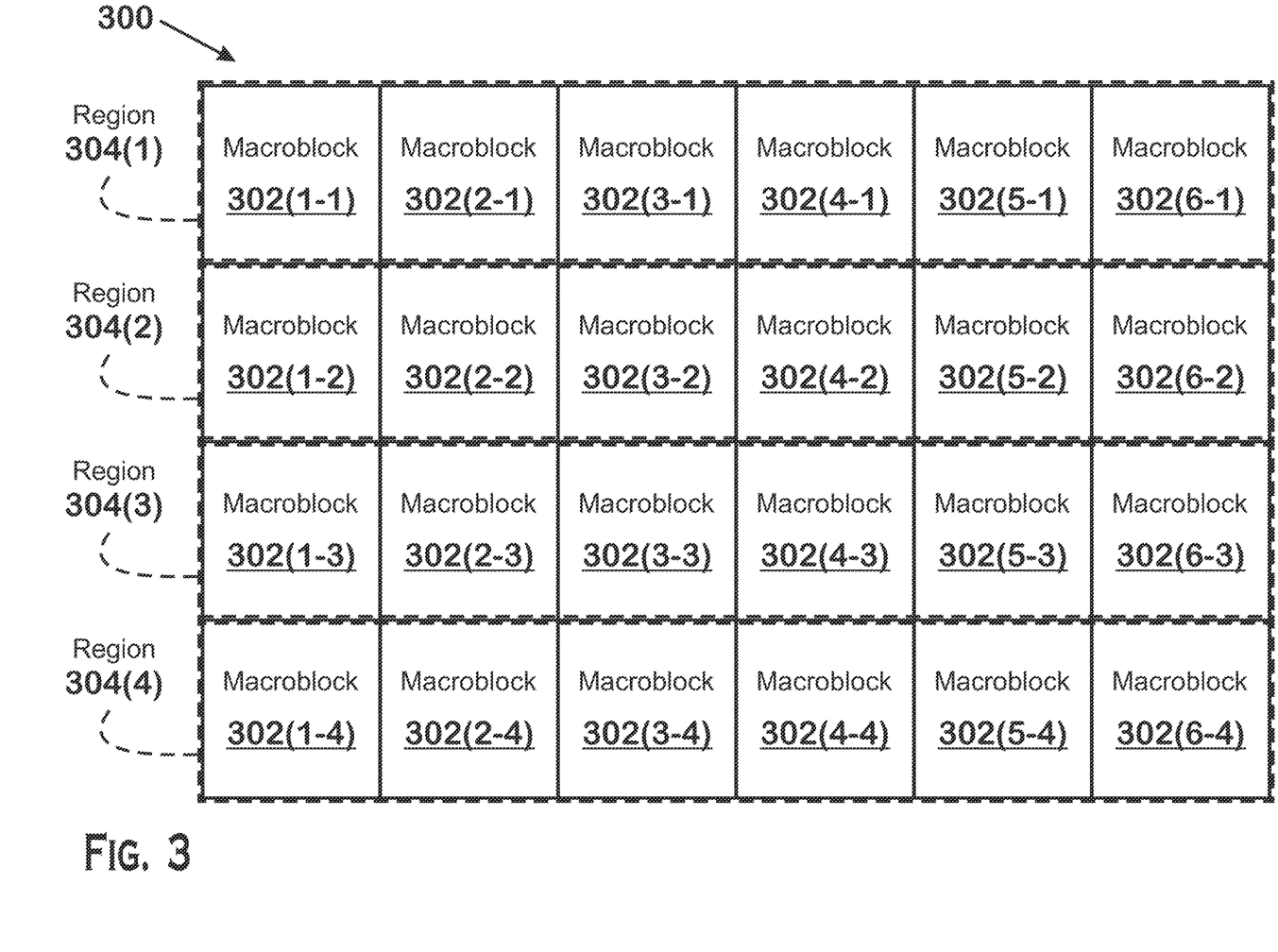
FIG. 3 illustrates the decomposition of a frame into macroblocks, according to an example.

FIG. 3 illustrates the decomposition of a frame 300 into macroblocks 302, according to an example. Each macroblock 302 includes a number of pixels of the frame 300. In addition, the frame 300 is divided into multiple regions 304, each of which includes multiple macroblocks 302. Although the regions 304 are shown as smaller than the frame 300, it is possible for a region 304 to be the size of a whole frame 300. It should also be understood that although a specific number of macroblocks 302 is shown, a frame 300 may include any number of macroblocks 302. In addition, each macroblock may include any number of pixels. It should be understood that the term "macroblock" is often used to refer to encoded blocks, but also sometimes refers herein to either the area of the frame corresponding to a macroblock or to the unencoded pixel data corresponding to the macroblock.

Figure 4:
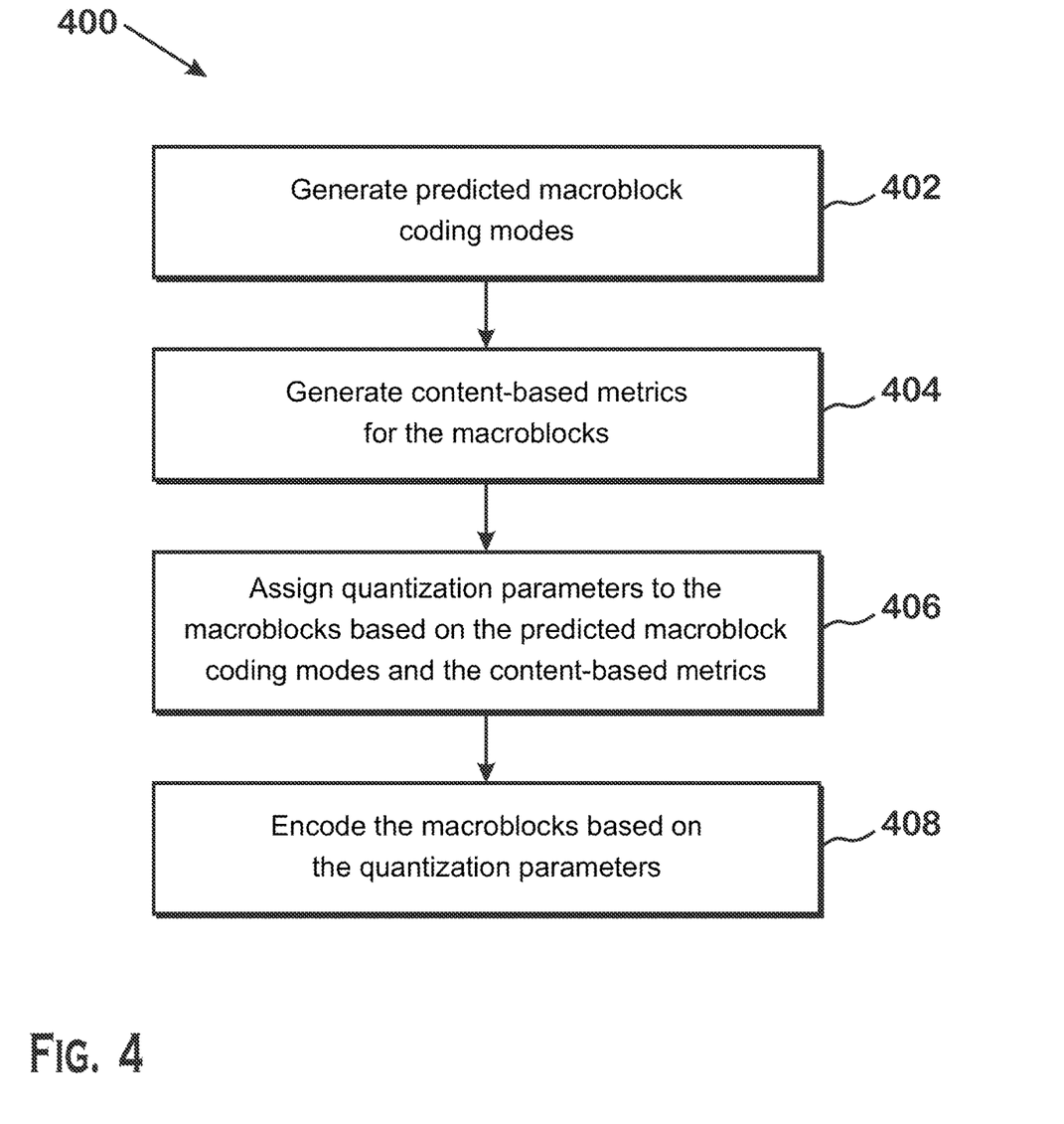
FIG. 4 is a flow diagram of a method for processing video data, according to an example.

FIG. 4 is a flow diagram of a method 400 for assigning quantization parameter values to macroblocks, according to an example. Although described with respect to the system of FIGS. 1-3, those of skill in the art will understand that any system, configured to perform the steps of the method 400 in any technically feasible order, falls within the scope of the present disclosure.

The method 400 begins at step 402, where the pre-encoding analysis block generates predicted macroblock coding modes for the macroblocks 302 of a frame 300. The predicted macroblock coding modes are predictions of what coding mode the encoder 140 will actually decide to code the macroblocks at. A coding mode is an indication of the manner in which the macroblock will be encoded. In some implementations, a coding mode indicates the manner in which reference pixel data is used to encode the macroblock. In some implementations, the coding mode indicates whether the macroblock is encoded with reference to the current frame (intra-coded macroblocks), to previous or subsequent frames (inter-coded macroblocks), or as blocks that rely almost entirely on data that is already encoded for another purpose (such as a co-located macroblock from the previous frame) and thus include no residual or motion vector data (skip blocks).

At step 404, the pre-encoding analysis block generates content-based metrics for the macroblocks. A content-based metric is a metric that takes into account content-based features of the frame being encoded that would not be considered by the encoder 140 when determining the quantization parameters for encoding the macroblocks. Some examples of content-based features include perceptual importance, which affords higher quality and a higher number of bits to portions of a frame that are deemed to be more important to the perception of a human being than for other portions of the frame, and region-of-interest analysis, where portions of a frame deemed to be a region of interest are afforded higher quality and a higher number of bits than portions of the frame not deemed to be within a region of interest.

At step 406, the pre-encoding analysis block 202 assigns quantization parameters to the macroblocks based on the predicted macroblock coding modes and the content-based metrics. At this step, having the predicted macroblock coding modes allows the pre-encoding analysis block 202 to assign quantization parameters in a manner that is more likely to be respected by the encoder 140 due to not resulting in an overshoot or undershoot than if the predicted macroblock coding modes were not available, and also results in better utilization of the total bit budget for the frame than if such predicted macroblock coding modes were not available. More specifically, the predicted macroblock coding modes allows the pre-encoding analysis block 202 to more accurately estimate the amount of data used by the macroblocks when given particular quantization parameters. This results in a better overall estimate of the amount of data used by a frame when encoded with a particular set of quantization parameters.

In some modes of operation, the pre-encoding analysis block 202 considers either the proportion of macroblock coding types in a region 304 when setting quantization parameters for macroblocks 302 in that region 304, or considers the actual macroblock prediction when setting the quantization parameter for that macroblock 302.

At step 408, the encoder 140 encodes the macroblocks based on the quantization parameters selected by the pre-encoding analysis block 202. In some situations, the encoder 140 obeys these quantization parameters for at least a portion of the frame. In some situations, the encoder 140 obeys these quantization parameters for the whole frame. In some situations, the encoder 140 completely disregards the quantization parameters. In general, an encoder 140 disregards quantization parameters produced by the pre-encoding analysis block 202 in the situation that obeying such quantization parameters would result in the frame being encoded at too high of a bitrate.

An example technique for generating predicted macroblock coding modes (step 402) are now provided. In this example technique, the pre-encoding analysis block 202 generates an activity metric for the macroblock and compares the activity metric for the macroblock in the same position but in the previous frame. If the difference between the two activity metrics is below a first threshold, then the pre-encoding analysis block 202 predicts that the macroblock is a skip block. If the difference between the two activity metrics is not below the first threshold, then the pre-encoding analysis block 202 predicts that the macroblock is not a skip block. The threshold may be set in any technically feasible manner, such as through empirical measurement of test data or of data in the current video being encoded.

In some examples, the activity metric is a metric derived from the pixel data of the macroblock. In some examples, the activity metric is, or is similar to, image entropy of the pixels in the macroblock. In some examples, image entropy is randomness of the pixels. In some examples, image entropy is Shannon entropy of the pixels. In various examples, the manner in which the activity metric is derived from the pixel data is the same for every macroblock. The activity metric is any metric that characterizes the pixels in a way that allows two different macroblocks to be compared for similarity. If the activity metric between two macroblocks is similar enough, then the pre-encoding analysis block 202 predicts that the macroblock is a skip block.

If the difference between the two activity metrics is not below the first threshold, then the pre-encoding analysis block 202 predicts that the macroblock is not a skip block. In this situation, the pre-encoding analysis block 202 determines whether to predict that the macroblock is an intra-coded block or an inter-coded block. In one example, to perform this determination, the pre-encoding analysis block 202 determines the macroblock within a search window in a previous frame that is deemed to be the most similar macroblock to the block for which the prediction is being made. Then the pre-encoding analysis block determines the difference between the activity metric of that most similar macroblock and the activity metric of the macroblock for which the prediction is being made. If this difference is below a second threshold, then the pre-encoding analysis block 202 determines that the predicted coding mode is inter-prediction. If this difference is not below the second threshold, then the pre-encoding analysis block 202 determines that the predicted coding mode is intra-prediction.

In some examples, the metric whose difference is compared to the second threshold is not an activity metric but is instead a metric that is typically used for motion prediction. In some examples, this metric is "cost." In some examples, the "cost" is the sum of absolute differences. In some examples, the sum of absolute differences is equal to the sum of the absolute values between the macroblock of the current frame (for which the coding mode is being determined) and the macroblock of the reference frame that is deemed most similar to the macroblock of the current frame. In some examples, the pre-encoding analysis block 202 identifies the most similar macroblock of a reference frame by searching within a search window for a macroblock having the lowest cost in comparison to the macroblock whose coding mode is being predicted.

As stated elsewhere herein, the pre-encoding analysis block 202 generates a content-based metric (e.g., a metric indicative of perceptual importance and/or region-of-interest analysis) for the macroblock (step 404). In some examples, the content-based metric, itself, is dependent on the macroblock prediction. In some examples, the content-based metric is additionally or alternatively dependent on the activity metric used to predict macroblock coding modes (step 402).

Example details for assigning quantization parameters to the macroblocks (step 406) are now provided. In some examples, the pre-encoding analysis block 202 generates the quantization parameters for the macroblocks based on the predicted coding block modes and based on the content-based metrics (generated at step 404). In some examples, generating the quantization parameters is also based on the activity metric for the macroblock for which the quantization parameter is being determined.

In some examples, generating the quantization parameter for the macroblocks based on the predicted coding block modes and based on the content-based metrics involves generating the quantization parameter for a macroblock based on the predicted coding block mode for that macroblock and based on the content-based metric of that macroblock. In other examples, generating the quantization parameter for the macroblocks based on the predicted coding block modes and based on the content-based metrics involves generating the quantization parameter for a macroblock based on the proportions of the different coding types of the macroblocks 302 that are in the region 304 that the macroblock for which the quantization parameter is being determined is in.

In some examples, the pre-encoding analysis block 202 bases the quantization parameters for macroblocks 302 in a region 304 on the proportion of predicted macroblock coding types in the following manner. The pre-encoding analysis block 202 obtains a bit budget for the region 304 from a bit budget source such as the encoder 140 or another source such as the processor 122. The pre-encoding analysis block 202 selects quantization parameters for the macroblocks 302 of the region 304 so that a total estimated amount of data used for the region 304, as indicated at least by estimated average data used for the predicted macroblock coding types of the region 304, and by the selected quantization parameters, falls within the bit budget for the region 304.

In some examples, the pre-encoding analysis block 202 stores average numbers of bits used for each macroblock coding type and uses these estimated numbers to generate an estimated total amount of data used for the region 304, given quantization parameters selected for the region 304. In some examples, the pre-encoding analysis block 202 updates these average numbers while encoding previous frames to generate estimates that are reasonably accurate for the content being encoded. For example, the pre-encoding analysis block 202 keeps a running set of the data for each coding type for macroblocks 302 already encoded and uses that running set of data to generate quantization parameter numbers. In some examples, the pre-encoding analysis block 202 also uses other metrics to determine estimated bits used for a region, such as either or both of the content-based metrics (step 404) and the activity metrics (step 402). In some examples, the pre-encoding analysis block 202 generates a lookup table that stores estimated bits used for a macroblock 304, given the macroblock coding type, the quantization parameter, and other information such as either or both of the content-based metrics and the activity metrics. In some examples, this information is provided to the pre-encoding analysis block 202 by another entity such as a diver or operating system executing on the processor 122. In some implementations, the rate control and coding mode selection block 210 is informed of the intended "trajectory," where the term "trajectory" indicates the intended average bitrate of the video as compared with the bitrate actually emitted by the encoder 140. The rate control and coding mode selection block 210 uses this trajectory to adjust the quantization parameters to meet the intended trajectory. In other words, the rate control and coding mode selection block 210 attempts to ensure that the encoded video is encoded at an intended bitrate.

In some examples, the pre-encoding analysis block 202 uses an iterative approach to set the quantization parameters. More specifically, the pre-encoding analysis block 202 begins at a particular cost category number and adjusts the cost category number until the estimated number of bits used for the region 304 is within the budget for the region. The cost category number is a "base" number that indicates a baseline level for setting the quantization parameter for the macroblocks 302. The pre-encoding analysis block 202 sets a quantization for a macroblock 302 using this base number as well as the content-based metric for the macroblock and, in some examples, either the macroblock coding type distribution for the region 304 or the macroblock coding type of the macroblock 302 for which the quantization parameter is being set. Thus adjusting the cost category number adjusts the quantization parameters for the macroblocks 302 of the region 304 and therefore the estimated total amount of bits used for a region 304.

In other examples, the pre-encoding analysis block 202 uses a non-iterative approach to set the quantization parameters. In some examples, the pre-encoding analysis block 202 includes a model such as a linear regression model or a machine learning model. The pre-encoding analysis block 202 applies the content-based metric for the macroblock and, in some examples, either the macroblock coding type distribution for the region 304 or the macroblock coding type of the macroblock 302 for which the quantization parameter is being set to the model to get a base number and sets the quantization parameters based on the base number.

Herein, phrases such as "a first value is determined based on a second value" or "a first value is dependent on a second value" means that there is some relationship definable by a function between the second value and the first value. A unit (such as the pre-encoding analysis block 202) that determines a first value based on a second value considers the second value in setting the first value.

Although this description states that quantization parameters are set by the pre-encoding analysis block 202, it should be understood that implementations that set values other than quantization parameters used by the transform 206 step of the encoder 140 also fall within the scope of the present disclosure. More specifically, the techniques disclosed herein for setting a quantization parameter may alternatively be used to set any value that adjusts the quality of macroblocks 302 and the amount of data used for those macroblocks 302.

It should be understood that many variations are possible based on the disclosure herein. Although features and elements are described above in particular combinations, in various implementations, each feature or element is used alone without the other features and elements or in various combinations with or without other features and elements.

The various functional units illustrated in the figures and/or described herein (including, but not limited to, the processor 102, the input driver 112, the input devices 108, the output driver 114, the output devices 110, the encoder 140 or the decoder 170 or any of the blocks thereof, or the pre-encoding analysis block 202) are, in various implementations, implemented as a general purpose computer, a processor, or a processor core, or as a program, software, or firmware, stored in a non-transitory computer readable medium or in another medium, executable by a general purpose computer, a processor, or a processor core. The methods provided are, in various implementations, implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors are, in various implementations, manufactured by configuring a manufacturing process using the results of processed hardware description language (HDL) instructions and other intermediary data including netlists (such instructions capable of being stored on a computer readable media). The results of such processing include maskworks that are then used in a semiconductor manufacturing process to manufacture a processor which implements aspects of the embodiments.

In various implementations, the methods or flow charts provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing video data, the method comprising:
   prior to motion prediction for a set of macroblocks of a frame, generating a quality map including predicted macroblock coding modes for the set of macroblocks of a frame, wherein each predicted macroblock coding mode of the predicted macroblock coding modes indicate, for a macroblock of the set of macroblocks associated with the predicted macroblock coding mode, the manner in which reference data is used to encode the macroblock;
   assigning quantization parameters to the macroblocks based on the predicted macroblock coding modes, wherein each quantization parameter of the quantization parameters indicates, for an associated macroblock, a quality and amount of data used for the macroblock; and
   encoding the set of macroblocks based on the quantization parameters, the encoding including determining a set of actual macroblock coding modes for the set of macroblocks.

2. The method of claim 1, wherein generating the predicted macroblock coding modes for a set of macroblocks includes:
   generating an activity metric for a first macroblock of the set of macroblocks; and
   comparing the activity metric to a threshold to determine whether the first macroblock has a predicted coding type of inter-coded.

3. The method of claim 2, further comprising:
   in response to the activity metric being below the threshold, determining that the first macroblock has a predicted coding type of skip.

4. The method of claim 2, further comprising:
   in response to the activity metric not being below the threshold, determining that the first macroblock does not have a predicted coding type of skip.

5. The method of claim 4, further comprising:
   comparing the activity metric to a second activity metric of a second macroblock considered to be the most similar macroblock within a search window to the first macroblock; and
   determining whether the first macroblock has a predicted coding type of inter-coded based on the comparing.

6. The method of claim 5, further comprising:
   in response to the difference between the activity metric and the second activity metric being below a second threshold, determining that the first macroblock has a predicted coding type of inter-coded.

7. The method of claim 5, further comprising:
   in response to the difference between the activity metric and the second activity metric not being below a second threshold, determining that the first macroblock has a predicted coding type of intra-coded.

8. The method of claim 1, wherein assigning quantization parameters to the macroblocks based on the predicted macroblock coding modes comprises:
   obtaining a bit budget for the set of macroblocks of the frame; and
   setting the quantization parameters for the macroblocks such that a total estimated data amount for the macroblocks, given the predicted macroblock coding modes, does not exceed the bit budget.

9. The method of claim 8, wherein setting the quantization parameters further comprises:
   setting the quantization parameters for the macroblocks such that a total estimated data amount for the macroblocks, given the predicted macroblock coding modes, is the highest possible without exceeding the bit budget.

10. A system for processing video data, the system comprising:
    a pre-encoding analysis circuit configured to:
       prior to motion prediction for a set of macroblocks of a frame, generate a quality map including predicted macroblock coding modes for the set of macroblocks of a frame, wherein each predicted macroblock coding mode of the predicted macroblock coding modes indicate, for a macroblock of the set of macroblocks associated with the predicted macroblock coding mode, the manner in which reference data is used to encode the macroblock; and
       assign quantization parameters to the macroblocks based on the predicted macroblock coding modes, wherein each quantization parameter of the quantization parameters indicates, for an associated macroblock, a quality and amount of data used for the macroblock; and
    an encoder configured to encode the set of macroblocks based on the quantization parameters, the encoding including determining a set of actual macroblock coding modes for the set of macroblocks.

11. The system of claim 10, wherein generating the predicted macroblock coding modes for a set of macroblocks includes:
    generating an activity metric for a first macroblock of the set of macroblocks; and
    comparing the activity metric to a threshold to determine whether the first macroblock has a predicted coding type of inter-coded.

12. The system of claim 11, wherein the pre-encoding analysis block is further configured to:
    in response to the activity metric being below the threshold, determine that the first macroblock has a predicted coding type of skip.

13. The system of claim 11, wherein the pre-encoding analysis block is further configured to:
    in response to the activity metric not being below the threshold, determining that the first macroblock does not have a predicted coding type of skip.

14. The system of claim 13, wherein the pre-encoding analysis block is further configured to:
    compare the activity metric to a second activity metric of a second macroblock considered to be the most similar macroblock within a search window to the first macroblock; and
    determine whether the first macroblock has a predicted coding type of inter-coded based on the comparing.

15. The system of claim 14, wherein the pre-encoding analysis block is further configured to:

in response to the difference between the activity metric and the second activity metric being below a second threshold, determine that the first macroblock has a predicted coding type of inter-coded.

16. The system of claim 14, wherein the pre-encoding analysis block is further configured to:

in response to the difference between the activity metric and the second activity metric not being below a second threshold, determine that the first macroblock has a predicted coding type of intra-coded.

17. The system of claim 10, wherein assigning quantization parameters to the macroblocks based on the predicted macroblock coding modes comprises:

obtaining a bit budget for the set of macroblocks of the frame; and setting the quantization parameters for the macroblocks such that a total estimated data amount for the macroblocks, given the predicted macroblock coding modes, does not exceed the bit budget.

18. The system of claim 17, wherein setting the quantization parameters further comprises:

setting the quantization parameters for the macroblocks such that a total estimated data amount for the macroblocks, given the predicted macroblock coding modes, is the highest possible without exceeding the bit budget.

19. A non-transitory computer-readable medium storing instructions that, when executed by a processor, cause the processor to perform operations comprising:

prior to motion prediction for a set of macroblocks of a frame, generating a quality map including predicted macroblock coding modes for the set of macroblocks of a frame, wherein each predicted macroblock coding mode of the predicted macroblock coding modes indicate, for a macroblock of the set of macroblocks associated with the predicted macroblock coding mode, the manner in which reference data is used to encode the macroblock;

assigning quantization parameters to the macroblocks based on the predicted macroblock coding modes, wherein each quantization parameter of the quantization parameters indicates, for an associated macroblock, a quality and amount of data used for the macroblock; and encoding the set of macroblocks based on the quantization parameters, the encoding including determining a set of actual macroblock coding modes for the set of macroblocks.

20. The non-transitory computer-readable medium of claim 19, wherein generating the predicted macroblock coding modes for a set of macroblocks includes:

generating an activity metric for a first macroblock of the set of macroblocks; and comparing the activity metric to a threshold to determine whether the first macroblock has a predicted coding type of inter-coded.

* * * * *